United States Patent
Miyake et al.

(10) Patent No.: US 6,815,481 B2
(45) Date of Patent: Nov. 9, 2004

(54) POLYBUTADIENE COMPOSITION

(75) Inventors: Kunihito Miyake, Yamatokoriyama (JP); Hironobu Iyama, Takatsuki (JP); Mutsuko Higo, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 295 days.

(21) Appl. No.: 09/902,109

(22) Filed: Jul. 11, 2001

(65) Prior Publication Data
US 2002/0032256 A1 Mar. 14, 2002

(30) Foreign Application Priority Data
Jul. 12, 2000 (JP) .................................. 2000-210999

(51) Int. Cl.$^7$ ................................. C08K 5/08
(52) U.S. Cl. ................ 524/358; 524/360; 524/370; 524/371
(58) Field of Search .............. 524/358, 360, 524/370, 371, 571; 585/19

(56) References Cited

U.S. PATENT DOCUMENTS 4,104,244 A * 8/1978 Chuchin et al. ............ 524/370
6,214,915 B1 * 4/2001 Avakian et al. ............ 524/358

* cited by examiner

*Primary Examiner*—Peter D. Mulcahy
(74) *Attorney, Agent, or Firm*—Birch, Stewart, Kolasch & Birch, LLP

(57) ABSTRACT

A polybutadiene composition comprising a polybutadiene type polymer and a compound represented by the following formula (I):

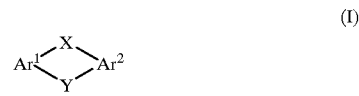

(I)

wherein $Ar^1$ and $Ar^2$ each independently represent an aromatic ring, X and Y each independently represent an alkylene group having one or two carbon atoms, an oxygen atom or a carbonyl group, is provided; and thermal degradation of the polybutadiene type polymer can be prevented even in an air-free environment.

8 Claims, No Drawings

POLYBUTADIENE COMPOSITION

BACKGROUND OF THE INVENTION

The present invention relates to a polybutadiene composition. More particularly, it relates to a polybutadiene composition in which the thermal degradation under an air free environment is prevented.

Polybutadiene type polymers having butadiene units as their polymerization unit have been widely used as various molded articles, since they exhibit same strength and elastic property as vulcanized elastomers and same thermo plastic property as thermoplastic resins. However, polybutadiene type polymers are apt to deteriorate by heat and to generate cross-linked products (gelled product) under heating. Such cross-linked products cause bad appearance of the molded article obtained by molding the polybutadiene type polymer. Particularly, when the molded article is a film, the cross-linked products lower the strength of the article.

For preventing such thermal degradation, a polybutadiene composition comprising a polybutadiene type polymer and an antioxidant is proposed. (JP-A-1-182308, etc.)

However, thermal degradation of such a conventional polybutadiene composition is not sufficiently prevented when the composition is heated under an air-free environment such as the inner part of an extruder.

The present inventors have conducted extensive studies to develop a polybutadiene composition which does not deteriorate by heating even under an air-free environment. As a results they have found that a polybutadiene composition comprising a specific compound does not deteriorate by heating even under an air-free environment. Thus, the present invention was completed.

The present invention provides a polybutadiene composition comprising a polybutadiene type polymer and a compound represented by the following formula (I):

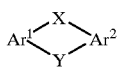

(I)

wherein $Ar^1$ and $Ar^2$ each independently represent an aromatic ring, X and Y each independently represent an alkylene group having one or two carbon atoms, an oxygen atom or a carbonyl group. (Hereinafter, this compound is referred to as "Compound (I)".)

The polybutadiene type polymer comprised in a polybutadiene composition of the present invention is a polymer having a polymerization unit derived from butadiene. Examples of the polybutadiene type polymers include polybutadiene, styrene-butadiene copolymers, acrylonitrile-butadiene copolymers, acrylonitrile-butadiene-styrene copolymers, styrene-butadiene block copolymers, and impact resistant polystyrenes. The polybutadiene type polymer may be either a rubber or a resin. Polybutadiene may be either a polybutadiene rubber produced by a solution polymerization or a polybutadiene rubber produced by a emulsion polymerization, The impact resistant polystyrene is a polystyrene modified with a polybutadiene rubber, a styrene-butadiene copolymer rubber or the like to suppress occurrence of cracks caused by an impact. Such polybutadiene type polymers can be produced, for example, by a solution polymerization method, emulsion polymerization method, decomposition of polymer, or the like. The polybutadiene type polymer may be used alone or as a mixture of two or more.

Examples of the aromatic ring represented by $Ar^1$ or $Ar^2$ in the formula (I) include a benzene ring and naphthalene ring.

X and Y in the formula (I) are divalent residues. X and Y, which are same to or different from each other, represent an alkylene group having one or two carbon atoms, an oxygen atom or a carbonyl group. The alkylene group having one or two carbon atoms may be, for example, a methylene group, dimethylene group. The alkylene group may also be a substituted alkylene group, where the hydrogen atom is substituted with another atom or a group. It is preferred that at least one of X and Y is an alkylene group having one or two carbon atoms, and it is more preferred that both of X and Y are alkylene groups having one or two carbon atoms.

Each of X or Y bonds to a carbon atom in $Ar^1$ in the formula (I), and a carbon atom in $Ar^2$ in the formula (I). The two carbon atoms in $Ar^1$ or $Ar^2$ bonding to X or Y are usually adjacent to each other.

The aromatic ring represented by $Ar^1$ or $Ar^2$ may be substituted with one or more substituents. Examples of the substituents include an alkyl group, a cycloalkyl group, an aryl group, an aralkyl group, an alkoxyl group, an acyloxy, a hydroxyl group, a halogen atom, a sulfo group (which is $SO_3H$) and carboxyl group.

Examples of the alkyl group as the substituent on $Ar^1$ or $Ar^2$ include methyl, ethyl, n-propyl, isopropyl, n-butyl, isobutyl, sec-butyl, t-butyl, 2-ethylbutyl, n-pentyl, isopentyl, 1-methylpentyl, 1,3-dimethylbutyl, n-hexyl. 1-methylhexyl, n-heptyl, 1-methylheptyl, 3-methylheptyl, n-octyl, t-octyl, 2-ethylhexyl, 1,1,3-trimethylhexyl, 1,1,3,3-tetramethylpentyl, nonyl, decyl, undecyl, 1-methyundecyl, dodecyl, 1,3,3,5,5-hexamethylhexyl, tridecyl, tetradecyl, pentadecyl, hexadecyl, heptadecyl, octadecyl, eicosyl and docosyl.

Preferably, the alkyl group is an alkyl group having one to 6 carbon atoms. The hydrogen atom(s) therein may be optionally substituted with another atom or a group.

As the cycloalkyl group as the substituent on $Ar^1$ or $Ar^2$, a cycloalkyl group having 5 to 8 carbon atoms can be exemplified. Specific examples thereof include cyclopentyl, methylcyclopentyl, dimethylcyclopentyl, cyclohexyl, methylcyclohexyl, dimethylcyclohexyl, trimethylcyclohexyl, t-butylcyclohexyl, cycloheptyl and cyclooctyl. The hydrogen atom in such a cycloalkyl group may be optionally substituted with another atom or a group.

As the aryl group as the substituent on $Ar^1$ or $Ar^2$, an aryl group having 6 to 20 carbon atoms can be exemplified. Specific examples thereof include phenyl, o-tolyl, p-tolyl, 2,3-xylyl, 2,4-xylyl, 2,5-xylyl, mesityl, naphthyl and anthryl. The hydrogen atom in such an aryl group may be optionally substituted with another atom or a group.

As the aralkyl group as the substituent on $Ar^1$ or $Ar^2$, an aralkyl group having 7 to 20 carbon atoms can be exemplified. Specific examples thereof include benzyl, phenylmethyl, methylbenzyl and naphthyl methyl. The hydrogen atom in such an aralkyl group may be optionally substituted with another atom or a group.

As the alkoxyl group as the substituent on $Ar^1$ or $Ar^2$, an alkoxyl group having 1 to 18 carbon atoms can be exemplified. Specific examples thereof include methoxy, ethoxy, n-propoxy, isopropoxy, n-butoxy, isobutoxy, sec-butoxy, pentyloxy and octadecyloxy. The hydrogen atom in such an alkoxyl group may be optionally substituted with another atom or a group.

As the acyloxyl group as the substituent on $Ar^1$ or $Ar^2$, an acyloxyl group having 1 to 18 carbon atoms can be exemplified, Specific examples thereof include acetoxy, propionyloxy, butyryloxy, isobutyryloxy, valeryloxy, isovaleryloxy and stearyloxy. The hydrogen atom in such an acyloxyl group may be optionally substituted with another atom or a group.

As the halogen atom as the substituent on $Ar^1$ or $Ar^2$, a fluorine atom, a chlorine atom and a bromine atom can be exemplified.

When $Ar^1$ and $Ar^2$ are benzene rings, the compound represented by the formula (I) is a compound represented by the following formula (I-1):

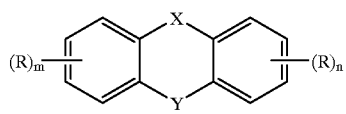

(I-1)

wherein m and n each independently represent an integer of 0–4, R represent an alkyl group, a cycloalkyl group, an aryl group, an aralkyl group, an alkoxyl group, an acyloxy group, a hydroxyl group, a halogen atom, a sulfo group and a carboxyl group, provided that, when sum of m and n is two or more, the groups of R may be same to or different from each other.

Examples of the compounds represented by the formula (I) include:

xanthene,
2,7-dimethylxanthene,
3,6-dimethylxanthene,
4,5-dimethylxanthene,
1,8-dimethyl-4,5-diisopropylxanthene,
9-phenylxanthene,
2-benzylxanthene,
9-benzylxanthene,
9-p-torylxanthene,
2,7-dimethyl-9-phenylxanthene,
9-hydroxylxanthene,
9-carboxylxanthene,
9-methoxylcarbonylxanthene,
9-methyl-9H-xanthene-2,7-diol,
9-ethyl-9H-xanthene-2,7-diol,
9-isopropyl-9H-xanthene-2,7-diol,
9-phenyl-9H-xanthene-2,7-diol,
3,4,5,6-tetramethyl-9H-xanthene-2,7-diol,
3,4,5,6,9-pentamethyl-9H-xanthene-2,7-diol,
3,4,5,6-tetramethyl-9-ethyl-9H-xanthene-2,7-diol,
1,3,4,5,6,8-hexamethyl-9H-xanthene-2,7-diol,
3,6-di-t-butyl-9-methyl-9H-xanthene-2,7-diol,
3,6-di-t-butyl-9-ethyl-9H-xanthene-2,7-diol,
3,6-di-t-butyl-9-cyclohexyl-9H-xanthene-2,7-diol,
1,3,4,5,6,8,9-heptamethyl-9H-xanthene-2,7-diol,
1,3,4,5,6,8-hexamethyl-9-ethyl-9H-xanthene-2,7-diol,
1,3,4,5,6,8-hexamethyl-9-isopropyl-9H-xanthene-2,7-diol,
1,3,4,5,6,8-hexamethyl-9-phenyl-9H-xanthene-2,7-diol,
xanthone,
1-hydroxyxanthone,
2-hydroxyxanthone,
3-hydroxyxanthone.
4-hydroxyxanthone,
1,3-dihydroxyxanthone,
1,3-dihydroxy-7-methoxyxanthone,
1,6,8-trihydroxy-3-methylxanthone,
1,3,6,7-tetrahydroxyxanthone,
2-chloroxanthone,
1,2-benzxanthone,
2,3-benzxanthone,
1,8-diisopropylxanthene, anthraquinone,
1-hydroxyanthraquinone,
1-methylanthraquinone,
2-methylanthraquinone,
2-ethylanthraquinone,
2-propylanthraquinone,
2-isopropylanthraquinone,
2-t-butylanthraquinone,
2-t-amylanthraquinone,
1,2-benzanthraquinone,
2-hydroxyanthraquinone,
1,2-dimethylanthraquinone.
1,3-dimethylanthraquinone,
1,4-dimethylanthraquinone,
2,3-dimethylanthraquinone
2,6-dimethylanthraquinone,
1,3-diethylanthraquinone,
1,2,4-trimethylanthraquinone,
1,3,6-trimethylanthraquinone.
1,4,6-trimethylanthraquinone,
1,3,5,7-tetramethylanthraquinone,
1,3,6,8-tetramethylanthraquinone,
anthraquinone-1-sulfonic acid,
anthraquinone-2-sulfonic acid,
sodium anthraquinone-1-sulfonate,
sodium anthraquinone -2-sulfonate,
anthraquinone-1,5-disulfonic acid,
anthraquinone-1,5-disulfonic acid.
anthraquinone-2,6-disulfonic acid,
anthraquinone-2,7-disulfonic acid,
anthraquinone-1,6-disulfonic acid,
anthraquinone-1,7-disulfonic acid,
2-methylanthraquinone-1-sulfonic acid,
2-ethylanthraquinone-1-sulfonic acid,
2,6-dimethylanthraquinone-1-sulfonic acid,
1,2-dihydroxyanthraquinone,
1,3-dihydroxyanthraquinone,
1,4-dihydroxyanthraquinone,
1,5-dihydroxyanthraquinone,
1,6-dihydroxyanthraquinone,
1,7-dihydroxyanthraquinone,
1,8-dihydroxyanthraquinone,
2,3-dihydroxyanthraquinone,
2,6-dihydroxyanthraquinone,
2,7-dibydroxyanthraquinone,
1,2,3-trihydroxyanthraquinone,
1,2,4-trihydroxyanthraquinone,
1,2,5-trihydroxyanthraquinone,
1,2,6-trihydroxyanthraquinone,
1,2,7-trihydroxyanthraquinone,
1,2,8-trihydroxyanthraquinone,
1,4,6-trihydroxyanthraquinone,
1,2,3,4-tetrahydroxyanthraquinone,
1,2,4,6-tetrahydroxyanthraquinone,
1,2.5,6-tetrahydroxyanthraquinone,
1,2,5,8-tetrahydroxyanthraquinone,
1,2,2,7-tetrahydroxyanthraquinone,
1,2,7,8-tetrahydroxyanthraquinone,
1,3,5,7-tetrahydroxyanthraquinone,
1,4,5,8-tetrahydroxyanthraquinone,
1,2,3,5,7-pentahydroxyanthraquinone,
1,2,4,5,8-pentahydroxyanthraquinone,
1,2,3,5,6,7-hexahydroxyanthraquinone,
1,2,4,5,6,8-hexahydroxyanthraquinone,
1,2,4,5,7,8-hexahydroxyanthraquinone,
1-methoxyanthraquinone,
2-methoxyanthraquinone, 1,3-dimethoxyanthraquinone,
1,4-dimethoxyanthraquinone,
1-ethoxyanthraquinone,
1,2-dihydroxyanthraquinone-3-sulfonic acid,
1,2,4-trihydroxyanthraquinone-3-sulfonic acid,
2,7-dihydroxyanthraquinone-3,6-disulfonic acid,
1,5-dihydroxyanthraquinone-2,6-disulfonic acid,
1,8-dihydroxyanthraquinone-2,7-disulfonic acid
1,2-dihydroxyanthraquinone-3,8-disulfonic acid,
1-chloroanthraquinone,
1,2-dichloroanthraquinone,
1,3-dichloroanthraquinone,
1,4-dichloroanthraquinone,
1,5-dichloroanthraquinone,
1,6-dichloroanthraquinone,
1,7-dichloroanthraquinone,
1,8-dichloroanthraquinone,
2,3-dichloroanthraquinone,
2,6-dichloroanthraquinone,
2,7-dichloroanthraquinone,
1,2,4-trichloroanthraquinone,
1,4,5-trichloroanthraquinone,
1,4,6trichloroanthraquinone,
1,2,3,4-tetrachloroanthraquinone,
1,4,5,8-tetrachloroanthraquinone,
1-bromoanthraquinone,
2-bromoanthraquinone,
1,2-dibromoanthraquinone,
1,3-dibromoanthraquinone,
1,4-dibromoanthraquinone,
1,5-dibromoanthraquinone,
1,6-dibromoanthraquinone,
1,7-dibromoanthraquinone,
1,8-dibromoanthraquinone,
2,3-dibromoanthraquinone,
2,6-dibromoanthraquinone,
2,7-dibromoanthraquinone,
1-chloro-4-methylanthraquinone,
1-chloro-2-methoxyanthraquinone,
1-methoxy-4-methylanthraquinone,
1-chloro-4-hydroxyanthraquinone,
1-hydroxyl-2,4-dibromoanthraquinone,
1,3,5,7-tetrahydroxyl-2,6-dibromoanthraquinone,
2,3-benzanthraquinone, anthrone,
1-methylanthrone,
2-methylanthrone.
3-methylanthrone,
10-methylanthrone,
10-ethylanthrone,
1,3-dimethylanthrone,
1,4-dimethylanthrone,
2,3-dimethylanthrone,
2,4-dimethylanthrone,
2,6-dimethylanthrone,
2-phenylanthrone,
10-phenylanthrone,
10-benzylanthrone,
2-chloroanthrone,
10-chloroanthrone,
1,6-dichloroanthrone,
4,10-dichloroanthrone,
10-bromoanthrone,
1-methoxyanthrone,
1-acetoxyanthrone,
10-acetoxyanthrone,
1-hydroxyanthrone,
2-hydroxyanthrone,
10-carboxyanthrone,
1-chloro-10-phenylanthrone,
1,5-dichloro-10-phenylanthrone,
10,10-bianthronyl,
1-chloroanthrone,
2,6-dichloroanthrone,
1,2-benzanthrone,
1-hydroxy-2-chloro-4,5-benzanthrone.
9,10-dihydroanthracene, sodium 9,10-dihydroanthracene sulfonate,
9,10-dihydroanthroryl methyl triethylammonium chloride,
9,10-dihydro-1-methylanthracene,
9,10-dihydro-2-methylanthracene,
9,10-dihydro-2-ethylanthracene,
1-(1,1-dimethylethyl)-9,10-dihydroanthracene,
9,10-dihydro-2-phenylanthracene,
9,9,10-dihydro-1-(phenylmethyl).-anthracene,
9,10-dihydro-2-(phenylmethyl)-anthracene,
9,10-dihydro-1-(chloromethyl)-anthracene,
9,10-dihydro-1-anthracenemethanol,
1-cyclohexyl-9,10-dihydroanthracene,
9,10-dihydro-2-methoxylanthracene,
9,10-dihydro-1-anthracene carboxylic acid,
9,10-dihydro-2-anthracene carboxylic acid,
1-fluoro-9,10-dihydroanthracene,
2-fluoro-9,10-dihydroanthracene,
1-chloro-9,10-dihydroanthracene,
2-chloro-9,10dihydroanthracene
9,10-dihydro-1,4-dimethylanthracene.
9,10-dihydro-2,6-dimethylanthracene,
9,10-dihydro-2,7-dimethylanthracene,
2,6-bis(1,1-dimethylethyl)-9,10-dihydroanthracene,
2,7-bis (1,1-dimethylethyl)-9,10-dihydroanthracene,
9,10-dihydro-1,4-dimethoxylanthracene,
9,10-dihydro-1,5-dimethoxylanthracene,
9,10-dihydro-2,6-dimethoxylanthracene,
9,10-dihydro-2,7-dimethoxylanthracene,
9,10-dihydro-1,8-dimethoxylanthracene,
9,10-dihydro-1,5-diethoxylanthracene,
9,10-dihydro-1,8-diethoxylanthracene,
9,10-dihydro-1-ethoxy-8-methoxy-lanthracene,
8-chloro-9,10-dihydro-1-anthracene carboxylic acid,
9,10-dihydro-1,8-dimethoxy-anthracene carboxylic acid,
9,10-dihydro-1,4-anthracenediol,
9,10-dihydro-1,8-anthracenediol,
9,10-dihydro-2,6-anthracene dicarboxylic acid,
5-chloro-9,10-dihydroanthracene,
2,6-dichloro-9,10-dihydroanthracene,
9,10-dihydro-2,3,6,7-tetramethylanthracene,
9,10-dihydro-2,3,7,8-anthracene tetraol tetra acetic acid,
9,10-dihydro-1,2,5,6-anthracene tetraol,
9,10-dihydro-2,3,6,7-tetraethoxyanthracene,
9,10-dihydro-2,3,6,7-tetraethoxyanthracene,
1,2,3,4-tetrachloro-9,10-dihydroanthracene,
1,4,5,6-tetrafluoro-9,10-dihydroanthracene,
9,10-dihydro-1,2,3,4,5,6,7,8-octamethylanthracene,
9,10-dihydro-2,9'-bianthracene.
9,10-dihydro-2,7-anthracene dicarboxylic acid dimethyl ester,
10,11-dihydro-5H-dibenzo[a,d]cycloheptene,
1,9-dibromo-3,7-bis(1,1-dimethylethyl)-10,11-dihydro-5H-d ibenzo[a,d]cycloheptene,
3,3+-(10,11-dihydro-5H-dibenzo[a,d]cycloheptene-3,7-diyl) bis-2-propenylchloride,
3,7-bis(1,1-dimethylethyl)-10,11-dihydro-1,9-dimethyl-5H-dibenzo[a,d]cycloheptene,
2,8-bis(1,1-dimethylethyl)-10,11-dihydro-4,6-bis[2,4,6-trimethylphenyl methyl]-5H-dibenzo[a,d]cycloheptene, 3,7-bis(chloromethyl)-10,11-dihydro-5H-dibenzo[a,d] cycloh eptene,
3,7-bis(1,1-dimethylethyl)-10,11-dihydro-5H-dibenzo[a,d] cycloheptene,
4,6-bis(chloromethyl)-2,8-bis(1,1-dimethylethyl)-10,11-dihydro-5H-dibenzo[a,d]cycloheptene,
10,11-dihydro-5H-dibenzo[a,d]cycloheptene-3-ol,
3-chloro-10,11-dihydro-5H-dibenzo[a,d]cycloheptene,
4,6-bis(chloromethyl)-10,11-dihydro-2,8-dimethoxy-1,3,7,9-tetramethyl)-5H-dibenzo[a,d]cycloheptene,
10,11-dihydro-1-methyl-5H-dibenzo[a,d]cycloheptene,
3,7-bis(1,1-dimethylethyl)-10,11-dihydro-1,9-dimethoxy-5H-dibenzo[a,d]cycloheptene,
3,7-bis(1,1-dimethylethyl)-10,11-dihydro-1,9-bis(phenylmethyl)-5H-dibenzo[a,d]cycloheptene,
10,11-dihydro-1,9-dimethyl-5H-dibenzo[a,d]cycloheptene,
10,11-dihydro-3-methyl-5H-dibenzo[a,d]cycloheptene,
1-(chloromethyl)-3,7-bis(1,1-dimethylethyl)-10,11-dihydro-5H-dibenzo[a,d]cycloheptene,
2,8-bis(1,1-dimethylethyl)-10,11-dihydro-4-methyl-5H-dibenzo[a,d]cycloheptene,
10,11-dihydro-4-methyl-5H-dibenzo[a,d]cycloheptene,
10,11-dihydro-3-(trifluoromethyl)-5H-dibenzo[a,d]cycloheptene,
10,11-dihydro-5H-dibenzo[a,d]cycloheptene-2-acetic acid,
4-(chloromethyl)-10,11-dihydro-2,8-dimethoxy-1,3,7,9-tetramethyl)-5H-dibenzo[a,d]cycloheptene,
1,9-bis(chloromethyl)-10,11-dihydro-3,7-dimethoxy-2,4,6,8-tetramethyl)-5H-dibenzo[a,d]cycloheptene,
10,11-dihydro-1-(phenylmethyl)-5H-dibenzo[a,d]cycloheptene,
10,11-dihydro-1,9-bis(phenylmethyl)-5H-dibenzo[a,d]cycloheptene,
10,11-dihydro-3,7-dimethyl-5H-dibenzo[a,d]cycloheptene,
1,9-bis(chloromethyl)-3,7-bis(1,1-dimethylethyl)-10,11-dihydro-5H-dibenzo[ad]cycloheptene,
2,8-bis(1,1-dimethylethyl)-10,11-dihydro-4,6-dimethyl-5H-dibenzo[a,d]cycloheptene,
10,11-dihydro-2-methyl-5H-dibenzo[a,d]cycloheptene,
10,11-dihydro-2,3-dimethyl-5H-dibenzo[a,d]cycloheptene,
2,8-bis(1,1-dimethylethyl)-10,11-dihydro-5H-dibenzo[a,d]cycloheptene,
10,11-dihydro-5H-dibenzo[a,d]cycloheptene-2-ol,
6-(chloromethyl)-10,11-dihydro-2,8-dimethoxy-1,3,7,9-tetramethyl)-5H-dibenzo[a,d]cycloheptene,
10,11-dihydro-2,3,7,8-tetramethoxy-5H-dibenzo[a,d]cycloheptene,
3,7-bis(1,1-dimethylethyl)-10,11-dihydro-1-(phenylmethyl)-5H-dibenzo[a,d]cycloheptene,
2,8-bis(1,1-dimethylethyl)-4,6-bis[(2,5-dimethylphenyl)methyl]-10,11-dihydro-5H-dibenzo[a,d]cycloheptene,
3,7-bis(1,1-dimethylethyl)-10,11-dihydro-1-methyl-5H-dibenzo[a,d]cycloheptene,
3-(chloromethyl)-10,11-dihydro-5H-dibenzo[a,d] cyoloheptene,
10,11-dihydro-4,6-dimethl-5H-dibenzo[a,d]cycloheptene, and
4-(chloromethyl)-2,8-bis (1,1-dimethylethyl)-10,11-dihydro-5H-dibenzo[a,d]cycloheptene.

Content of the Compound (I) in the polybutadiene composition of the present invention is usually 0.01 part by weight or more, preferably 0.01 part by weight or more, based on 100 parts by weight of the polybutadiene composition. When the content of Compound (I) is less than 0.01 part by weight, thermal degradation cannot be prevented sufficiently. There is no specific upper limit of the content of Compound (I). However, from economical view point, it is usually 10 part by weight or less, preferably 5 part by weight or less.

The polybutadiene composition of the present invention may optionally comprise an antioxidant such as phenol antioxidants, sulfur antioxidants and phosphorous antioxidant.

Examples of the phenol antioxidant include (1) alkylated monophenols, such as 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6'-(1'-methylheptadecyl-1'-yl)phenol, 2,4-dimethyl-6-(1'-methyltridecyl-1'-yl)phenol and a mixture thereof;

(2) alkylthiomethylphenols such as 2,4-dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol and a mixture thereof;

(3) hydroquinones and alkylated hydroquinones such as 2,6-di-t-butyl-4-methoxyphenol, 2,5-di-t-butylhydroquinone. 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenyl stearate, bis(3,5-di-t-butyl-4-hydroxyphenyl)adipate and a mixture thereof;

(4) tocopherols such as α-tocopherol, β-tocopherol, γ-tocopherol, δ-tocopherol and a mixture thereof;

(5) hydroxylated thiodiphenyl ethers such as 2,2'-thiobis(6-t-butylphenol), 2,2'-thiobis(4-methyl-6-t-butylphenol), 2,2'-thiobis(4-octylphenol) 4,4'-thiobis(3-methyl-6-t-butylphenol), 4,4'-thiobis(2-methyl-6-t-butylphenol), 4,4'-thiobis(3,6-di-t-amylphenol), 4,4'-(2,6-dimethyl-4-hydroxyphenyl)disulfide and the like;

(6) alkylidenebisphenols and derivative thereof such as 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol)], 2,2'-methylenebis(4-methyl-6-cyclohexylphenol), 2,2'-methylenebis(4-methyl-6-nonylphenol), 2,2'-methylenebis(4,6-di-t-butylphenol)], 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane. 1,1-bis(5-t-butyl-4-hydroxy-2-methylphenyl)butane, 2,6-bis[3-t-butyl-5-methyl-2-hydroxybenzyl]-4-methylpheno 1,1,1,3-tris(5-t-butyl-4-hydroxy-2-methylphenyl)butane, 1,1-bis(5-t-butyl-4-hydroxy-2-methylphenyl)-3-n-dodecylmercaptobutane, bis[3,3-bis-3'-t-butyl-4'-hydroxyphenyl]butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl] terephthalate, 1,1-bis(3,5-dimethyl-2-hydroxyphenyl) butane, 2,2-bis(3,5-di-t-butyl-4-hydroxyphenyl)propane, 2,2-bis(5-t-butyl-4-hydroxy-2-methylphenyl)-4-n- dodecylmercaptobutane, 1,1,5,5-tetra(5-t-butyl-4-hydroxy-2-methylphenyl)pentane, 2-t-butyl-6-(3'-t-butyl-5'-methyl-2'-hydroxybenzyl)-4-methylphenyl acrylate, 2,4-di-t-pentyl-6-[1-(2-hydroxy-3,5-di-t-pentylphenyl)ethyl]phenyl acrylate and a mixture thereof;

(7) O-, N- and S-benzyl derivatives such as 3,5,3',5'-tetra-t-butyl-4,4'-dihydroxydibenzyl ether, octadodecyl-4-hydroxy-3,5-dimethylbenzylmercapto acetate, tris(3,5-di-t-butyl-4-hydroxybenzyl)amine, bis(4-t-butyl-3-hydroxy-2,6-dimethylbenzyl)dithioterephthalate, bis(3,5-di-t-butyl-4-hydroxybenzyl)sulfide, isooctyl-3,5-di-t-butyl-4-hydroxybenzylmercapto acetate and a mixture thereof;

(8) hydroxybenzylated malonate derivatives such as dioctadecyl-2,2-bis(3,5-di-t-butyl-2-hydroxybenzyl) malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl)phenyl]-2,2-bis(3,5-di-t-butyl-4-hydroxybenzyl)malonate and a mixture thereof;

(9) aromatic hydroxybenzyl derivatives such as 1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and a mixture thereof;

(10) triazine derivatives 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)-1,3,5-triazine, 2,4,6-tris(3,5-di-t-butyl-4-hydroxy)-1,3,5-triazine, tris(4-t-butyl-3-hydroxy-2,6-dimethylbenzyl isocyanurate, tris(3,5-di-t-butyl-4-hydroxybenzyl) isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine,tris(3,5-dicyclohexyl-4-hydroxybenzyl)isocyanurate, tris[2-(3',5'-di-t-butyl-4'-hydroxycinnamoyloxy)ethyl]isocyanurate and a mixture thereof;

(11) benzyl phosphonate derivatives such as dimethyl-3,5-di-t-butyl-4-hydroxybenzyl phosphonate, diethyl-3,5-di-t-butyl-4hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salt of 3,5-di-t-butyl-4-hydroxybenzyl phosphonic acid monoester and a mixture thereof;

(12) acylaminophenol derivatives such as anilide 4-hydroxylaurate, anilide 4-hydroxystearate, octyl-N-(3,5-di-t-butyl-4-hydroxyphenyl)carbanate and a mixture thereof;

(13) esters of β-(3,5-di-t-butyl-4-hydroxyphenyl)propionic acid and the following monohydric or polyhydric alcohol: methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof;

(14) esters of β-(5-t-butyl-4-hydroxy-3-methylphenyl) propionic acid and the following monohydric or polyhydric alcohol: methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof;

(15) esters of β-(3,5-dicyclohexyl-4-hydroxyphenyl) propionic acid and the following monohydric or polyhydric alcohol:
methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octan e and a mixture thereof;

(16) esters of 3,5-di-t-butyl-4-hydroxyphenylacetic acid and the following monohydric or polyhydric alcohol:
methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, Spiro glycol, triethylene glycol, pentaerythritol, tris (hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo2,2,2)octane and a mixture thereof; and

(17) amides of β-(3,5-di-t-butyl-4-hydroxyphenyl)propionic acid such as N,N'-bis[3-(3',5'-di-t-butyl-4'-hydroxyphenyl) propionyl] hydrazine, N,N'-bis[3-(3',5'-di-t-butyl-4'-hydroxyphenyl propionyl] hexamethylenediamine, N,N'-bis[3-(3',5'-di-t-butyl-4'-hydroxyphenyl)propionyl] trimethylenediamine and a mixture thereof.

Phenol antioxidants such as those mentioned above can be used singly or as a combination of two or more of them.

Examples of the phosphorous antioxidant include:
triphenyl phosphite, tris(nonylphenyl)phosphite, tris(2,4-di-t-butylphenyl)phosphite, trilauryl phosphite, trioctadecyl phosphite, distearyl pentaerythritol diphosphite, diisodecyl pentaerythritol diphosphite, bis(2,4-di-t-butylphenyl) pentaerythritol diphosphite, bis(2,4-di-t-butyl-6-methylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis (2,4,6-tri-t-butylphenyl)pentaerythritol diphosphate, tristearyl sorbitol triphosphite, tetrakis(2,4-di-t-butylphenyl)-4,4'-diphenylene diphosphite, 2,2'-methylenebis(4,6-di-t-butylphenyl)2-ethylhexyl phosphite, 2,2'-ethylidenebis(4,6-di-t-butylphenyl)fluoro phosphate, bis(2,4-di-t-butyl-6-methylphenyl)ethyl phosphite, bis(2,4-di-t-butyl-6-methylphenyl)methyl phosphate, (2,4,6-tri-t-butylphenyl)-5-ethyl-5-butyl-1,3,2-oxaphosph orinane, 2,2', 2"-nitrilo[triethyl-tris(3,3',5,5'-tetra-t-butyl-1,1'-biphenyl-2,2'-diyl)phosphite and a mixture thereof.

Phosphorous antioxidants such as those mentioned above can be used singly or as a combination of two or more of them.

Examples of the sulfur antioxidant include:
dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetraylkis(3-lauryl thiopropionate) and a mixture thereof.

Sulfur antioxidants such as those mentioned above can be used singly or as a combination of two or more of them.

Usually, an antioxidant such as those mentioned above is comprised in an amount of 0.001 part by weight or more in the polybutadiene composition of the present invention based on 100 parts by weight of the polybutadiene composition. From economical view point, its amount is usually 10 part by weight or less based on 100 parts by weight of the polybutadiene composition.

The polybutadiene composition of the present invention may further comprise other additives such as ultraviolet absorber, photostabilizer, hydroxylamine, metal inactivating agent, lubricant, metal soap, nucleating agent, antistatic agent, flame retardant, pigment, filler and the like.

Examples of the ultraviolet absorbers include (1) salicylate derivatives such as phenyl salicylate, 4-t-butylphenyl salicylate, 2,4-di-t-butylphenyl 3',5'-di-t-butyl-4'-hydroxybe zoate, 4-t-octylphenyl salicylate, bis(4t-butylbenzoyl)resorcinol, benzoylresorcinol, hexadecyl 3',5'-di-t-butyl-4'-hydroxybenzoate, octadecyl 3',5'-di-t-butyl-4'-hydroxybenzoate, 2-methyl-4,6-di-t-butylphenyl 3',5'-di-t-butyl-4'-hydroxybenzoate and a mixture thereof;

(2) 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-nethoxyphenyl)methane, 2,2',4,4'-tetrahydroxybenzophenone and a mixture thereof; and (3) 2-(2-hydroxyphenyl)benzotriazoles such as 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxypheny)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzotriazole, 2-[(3'-t-butyl-2'-hydroxyphenyl)-5'-(2-octyloxycarbonylethyl)phenyl]-5-chlorobonzotriazole, 2-[3'-t-butyl-5'-[2-(2-ethylhexyloxy)carbonylethyl]-2'-hydroxyphenyl]-5-chlorobenzotriazole, 2-[3'-t-butyl-2'-hydroxy-5'-(2-methoxycarbonylethyl)pheny1)-5-chlorobenzotriazole, 2-[3'-t-butyl-2'-hydroxy-5'-(2-methoxycarbonylethyl)pheny 1]benzotriazole, 2-[3'-t-butyl-2'-hydroxy-5-(2-octyloxycarbonylethyl)pheny 1]benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-me thylphenyl]benzotriazole, 2-(3',5'-di-t-butyl-2-hydroxyphenyl)-5-chlorobenzotriazole, mixture of 2-(3'-dodecyl-2'-hydroxy-5'-methylphenyl)benzotriazole and 2-[3'-t-butyl-2'-hydroxy-5'-(2-isooctyloxycarbonylethyl)phenyl]benzotriazole, 2,2'-methylenebis[6-(2H-benzotriazol-2-yl)-4-(1,1,3,3-tet ramethylbutyl) phenol, 2,2'-methylenebis[4-t-butyl-6-(2H-benzotriazol-2-yl)pheno 1], condensate of poly(3–11)(ethylene glycol) and 2-[3'-t-butyl-2'-hydroxy-5'-(2-methoxycarbonylethyl)pheny 1]benzotriazole, Condensate of poly(3–11) (ethylene glycol) and methyl 3-[3-(2H-benzotriazol-2-yl)-5-t-butyl-4-hydroxyphenyl]propionate, 2-ethylhexyl 3-[3-t-butyl-5-(5-chloro-2H-benzotriazol-2-yl)-4-hydroxyphenyl] propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl]propionic acid and a mixture thereof.

The ultraviolet absorbers such as those mentioned above can be used singly or as a combination of two or more of them.

Examples of the photo stabilizer include (1) hindered amine photo stabilizers such as bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebac ate, bis(1,2,2,6,6-pentamethyl-4-piperidyl) 2-(3,5-di-t-butyl-4-hydroxybenzyl)-2-butylmalonate, bis(1-acrolyl-2,2,6,6-tetramethyl-4-piperidyl) 2,2-bis(3,5-di-t-butyl-4-hydroxybenzyl)-2-butylmalonate, bis (1,2,2,6,6-penatmethyl-4-piperidyl decanedioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetarkis(2,2,6,6-tetramethyl-4-piperidyl) 1,2,3,4-butaneteracarboxylate, tetrakis(1,2,2,6,6-pentamethyl-4-piperidyl) 1,2,3,4-butanetetracarboxylate, mixed esterified product of 1,2,3,4-butanetetracarboxylic acid and 1,2,2,6,6-pentamethyl-4-piperidinol and 1-tridecanol, mixed esterified product of 1,2,3,4-butane tetracarboxylic acid and 2,2,6,6-tetramethyl-4-piperidinol and 1-tridecanol, mixed esterified product of 1,2,3,4-butanetetracarboxylic acid arid 1,2,2,6,6-pentamethyl-4-piperidinol and 3,9-bis(2-hydroxy-1,1-dimethylethyl)-2,4,8,10-tetraoxaspiro[5,5]-undecane, mixed esterified product of 1,2,3,4-butanetetracarboxylic acid and 2,2,6,6-tetarmethyl-4-piperidinol and 3,9-bis(2-hydroxy-1,1-dimethylethyl)-2,4,8,10-tetraoxaspiro[5,5]undecane, polycondensate of dimethyl succinate and 1-(2-hydroxyethyl)-4-hydroxy-2,2,6,6-tetramethylpiperidine, poly[(6-morpholino-1,3,5-triazin-2,4-diyl)((2,2,6,6-tetramethyl-4-piperidyl)imino)hexamethylene ((2,2,6,6-tetramethyl-4-piperidyl)imino)], poly[(6-(1,1,1,3-tetramethylbutyl)imino1,3,5-triazin-2,4-diyl ((2,2,6,6-tetramethyl-4-piperidyl)imino)hexamethylene ((2,2,6,6-tetramethyl-4-piperidyl)imino)), polycondensate of N,N'-bis(2,2,6,6-tetramethyl-4-piperidyl)hexamethylenedia mine and 1,2-bromoethane, N,N',4,7-tetrakis[4,6-bis(N-butyl-N-(2,2,6,6-tetramethyl-4-piperidyl)amino)-1,3,5-triazin-2-yl-]-4,7-diazadecane-1, 10 diamine, N,N',4-tris[4,6-bis(N-butyl-N-(2,2,6,6-tetramethyl-4-piperidyl)amino)-1,3,5-triazin-2-yl]-4,7-diazadecane-1,10 diamine, N,N',4,7-tetrakis[4,6-bis(N-butyl-N-(1,2,2,6,6-pentamethyl 1,4-piperidyl)amino)-1,3,5-triazin-2-yl]-4,7-diazadecane-1,10 diamine, N,N', 4-tris[4,6-bis(N-butyl-N-(1,2,2,6,6-pentamethyl-4-piperidyl)amino)-1,3,5-triazin-2-yl]-4,7-diazadecane-1,10 diamine and a mixture thereof;

(2) acrylate photo stabilizers such as ethyl α-cyano-β,β-diphenylacrylate, isooctyl α-cyano-β, β-diphenylacrylate, methyl α-carbomethoxycinnamate, methyl α-cyano-β-methyl-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline and a mixture thereof;

(3) nickel photo stabilizers such as nickel complex of 2,2'-thiobis-[4-(1,1,3,3-tetramethylbutyl)phenol], nickel dibutyldithiocarbamate, nickel salt of monoalkyl ester, nickel complex of ketoxime and a mixture thereof;

(4) oxamide photo stabilizers such as 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and a mixture thereof, and (5) 2-(2-hydroxyphenyl)-1,3,5-triazine photo stabilizers such as 2,4,6-tris(2hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylpheny 1)-1,3,5-triazine, 2-(2-hydroxy-4-octyloxyphenyl)-4,6-bis(4methylphenyl)-1,3,5-triazine, 2-(2-hydroxy-4-dodecyloxyphenyl)-4,6-bis(4-methylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy)phenyl]4,6-bis(2,4-dimethylphenyl)-1,3,5-triazine and a mixture thereof Examples of the hydroxyamine include N,N-dibenzylhydroxyamine, N,N-diethylhydroxyamine, N,N-dioctylhydroxyamine, N,N-dilaurylhydroxyamine, N,N-ditatradecylhydroxyamine, N,N-dihexadecylhydroxyamine, N,N-dioctadecylhydroxyamine, N,N-dibenzylhydroxyamine, N,N-dibenzylhydroxyamine, N-hexadecyl-N-octadecylhydroxyamine, N-heptadecyl-N-octadecylhydroxyamine and a mixture thereof.

Examples of the metal inactivating agent include N,N'-diphenyloxamide, N-salicylal-N'-salicyloylhydrazine, N,N'-bis(salicyloyl)hydrazine, N,N'-bis(3,5-di-t-butyl-4-hydroxyphenylpropionyl)hydrazine, 3-salicyloylamino-1,2,4-triazole, bis (benzylidene)oxalyl dihydrazide, oxalinide, isophthaloyl dihydrazide, sebacoylbisphenyl hydrazide, N,N'-bis salicyloyl)thiopropionyl dihydrazide and a mixture thereof.

Examples of the lubricant include aliphatic hydrocarbon such as paraffin or wax, higher aliphatic acid having 8 to 22 carbon atoms, higher aliphatic acid (having 8 to 22 carbon atoms) metal (Al, Ca, Mg, Zn) salt, aliphatic alcohol having 8 to 22 carbon atoms, polyglycol, ester of higher fatty acid having 4 to 22 carbon atoms and aliphatic monohydric alcohol having 4 to 18 carbon atoms, higher aliphatic amide having 8 to 22 carbon atoms, silicone oil, rosin derivative and the like.

The polybutadiene composition of the present invention can be produced, for example, by melt-kneading a polybutadiene type polymer and Compound (I). More specifically saying, it can be produced by adding Compound (I) to a melt-kneaded polybutadiene type polymer, followed by melt-kneading, further. Alternatively, the Compound (I) can be added while the polymerization reaction for producing the polybutadiene type polymer is proceeding or immediately after the end of the polymerization reaction, The Compound (I) may be added as a solid state or as a solution where it was dissolved in a solvent.

When an antioxidant and/or another additive are added to the composition, the Compound (I) may also be added at the same time. When they are added at the same time, the Compound (I) may be dissolved in a heat-melted antioxidant and/or other additive. If the antioxidant and/or other additive are in liquid state, the Compound (I) may be dissolved or dispersed in them.

The Compound (I) prevents thermal degradation of a polybutadiene type polymer, and stabilizes said polymer.

Accordingly, incorporating the Compound (I) in a polybutadiene type polymer is a effective method for stabilizing the polybutadiene type polymer. In the stabilizing method, the amount of Compound (I) to be incorporated in the polybutadiene composition is usually 0.01 part by weight or more, preferably 0.05 part by weight or more, and usually 10 parts by weight or less, preferably 5 parts by weight or less.

The Compound (I) is useful as a stabilizer for a polybutadiene type polymer to suppress thermal degradation of the polymer. The stabilizer may optionally comprise an antioxidant or another additive in addition to the Compound (I).

As explained above, in the polybutadiene composition, thermal degradation of the polybutadiene type polymer is suppressed. As the result, generation of crosslinked matter in various molded articles, such as hoses, footwear, toys, films and various vessels, which are obtained by injection molding, extrusion, blow molding or the like, can be reduced, if the molded articles are produced from the polybutadiene composition of the present invention.

In the polybutadiene composition of the present invention, thermal degradation of the polybutadiene type polymer can be prevented even in an air-free environment.

The present invention will be explained in more detail with the following examples, which should not be construed to limit the scope of the invention. In the examples, parts is weight basis unless otherwise stated.

EXAMPLES 1–6

To 100 parts of styrene-butadiene block copolymer [melt-flow rate: 13.3 g/10 minutes], 0.1 part of each of the compounds 1–6 listed below was added as the Compound (I), and the mixture was melt-kneaded at 200° C. with 30 mmφ mono-axial extruder to obtain pellets of the polybutadiene composition.

compound 1: 9,10-dihydroanthracene compound 2: 10,11-dihydro-5H-dibenzo[a,d]cycloheptene compound 3: xanthene compound 4: xanthone (9-xanthenon)

compound 5: anthraquinone compound 6: anthrone

Melt flow rate of the pellets was measured with a melt indexer [L246-2531, manufactured by Techno Seven Co.] at the holding time of 15 minutes, at the temperature of 245° C., and at the load of 2160 g. The results are shown in Table 1. The smaller melt flow rate at the holding time of 15 minutes Indicates the less thermal degradation and crosslinked matter.

Comparative Example 1

According to the same procedure as in Examples 1–6 except that 0.1 part of the Compound (I) was not added, pellets were obtained, and melt flow rate at the holding time of 15 minutes was measured. The results are shown in Table 1.

TABLE 1

| Compound (I) | Example No. | | | | | | Comparative Example 1 |
|---|---|---|---|---|---|---|---|
| | 1 | 2 | 3 | 4 | 5 | 6 | |
| Amount of the Compound (I)* | | | | | | | |
| Compound 1 | 0.1 | — | — | — | — | — | — |
| Compound 2 | — | 0.1 | — | — | — | — | — |
| Compound 3 | — | — | 0.1 | — | — | — | — |
| Compound 4 | — | — | — | 0.1 | — | — | — |
| Compound 5 | — | — | — | — | 0.1 | — | — |
| Compound 6 | — | — | — | — | — | 0.1 | — |
| MFR (g/10 minutes) | 39 | 34 | 39 | 35 | 34 | 38 | 4 |

*parts per 100 parts of the composition

EXAMPLES 7–9

To 100 parts of acrylonitrile-butadiene-styrene copolymer [melt-flow rate: 13.3 g/10 minutes], 0.1 part of each of the compounds 1, 3 and 6 listed below was added as the Compound (I), and the mixture was melt-kneaded at 240° C. with 30 mmφ mono-axial extruder to obtain pellets of the polybutadiene composition, which were then dried with hot air.

compound 1: 9,10-dihydroanthracene compound 3: xanthene compound 6: anthrone

Immediately after the pellets thus obtained were heated to 245° C., molding was conducted with 5.50 z injection molder to obtain an Izod test bar having a thickness of 4 mm for impact test. According to JS K 7110, impact resistance was measured. The results are shown in Table 1 in the raw "Izod before holding".

The same procedure as above was repeated except that the molding was conducted not immediately after but after 15 minutes of melt-kneading at 245° C. in the same injection molder. Then, according to JIS K 7110, impact resistance was measured, and the results are shown in Table 2 in the raw "Izod after holding".

Comparative Example 2

According to the same procedure as in Examples 7–9 except that 0.1 part of the Compound (I) was not added, pellets were obtained, and impact resistances before and after holding were measured. The results are shown in Table 2 in the raws, "Izod before holding" and "Izod after holding".

TABLE 2

| Compound (I) | Example No. | | | Comparative Example 2 |
|---|---|---|---|---|
| | 7 | 8 | 9 | |
| Amount of the Compound (I) | | | | |
| Compound 1 | 0.1 | — | — | — |
| Compound 3 | — | 0.1 | — | — |
| Compound 6 | — | — | 0.1 | — |

TABLE 2-continued

| Compound (I) | Example No. | | | Comparative Example 2 |
|---|---|---|---|---|
| | 7 | 8 | 9 | |
| Izod (Kg.cm.cm) | | | | |
| Before holding | 24.6 | 24.8 | 25.1 | 22.7 |
| After holding | 18.1 | 18.5 | 20.1 | 15.6 |

What is claimed is:

1. A polybutadiene composition comprising a polymer having a butadiene unit as a polymerization unit and a compound represented by the following formula (I):

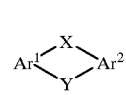

(I)

wherein $Ar^1$ and $Ar^2$ each independently represent an aromatic ring or an aromatic ring substituted with at least one substituent group selected from the group consisting of an alkyl, cycloalkyl, aryl, aralkyl, alkoxy, acyloxy, hydroxy groups, a halogen atom, a sulfo group and a carboxyl group, X and Y each independently represent an alkylene group having one or two carbon atoms, or an oxygen atom.

2. The polybutadiene composition according to claim 1 wherein the polymer having a butadiene unit as a polymerization unit is a polymer selected from polybutadiene, styrene-butadiene copolymers, acrylonitrile-butadiene copolymers, acrylonitrile-butadiene-styrene copolymers, styrene-butadiene block copolymers and impact resistant polystyrenes.

3. The polybutadiene composition according to claim 1 wherein content of the compound represented by the formula (I) is 0.01 part by weight or more based on 100 parts by weight of the polybutadiene composition.

4. A polybutadiene composition according to claim 1, wherein $Ar^1$ and $Ar^2$ each independently represent an aromatic ring or an aromatic ring substituted with at least one substituent group selected from the group consisting of alkyl, cycloalkyl, aryl, alkoxy, acyloxy, hydroxy groups, a halogen atom, a sulfo group and a carboxyl group.

5. A polybutadiene composition according to claim 1, wherein $Ar^1$ and $Ar^2$ each independently represent an aromatic ring or an aromatic ring substituted with at least one substituent group selected from the group consisting of an $C_{1-6}$ alkyl, $C_{5-8}$ cycloalkyl, $C_{6-20}$ aryl, $C_{7-20}$ aralkyl, $C_{1-18}$ alkoxy, $C_{1-18}$ acyloxy, hydroxy groups, a halogen atom, a sulfo group and a carboxyl group.

6. A polybutadiene composition according to claim 1, wherein $Ar^1$ and $Ar^2$ each independently represent an aromatic ring or an aromatic ring substituted with at least one substituent group selected from the group consisting of an $C_{1-6}$ alkyl, $C_{5-8}$ cycloalkyl, $C_{6-20}$ aryl, $C_{1-18}$ alkoxy, $C_{1-18}$ acyloxy, hydroxy groups, a halogen atom, a sulfo group and a carboxyl group.

7. A polybutadiene composition according to claim 1 or 5, wherein $Ar^1$ and $Ar^2$ are benzene rings.

8. A composition according to claim 1, wherein X represents an alkylene group having one or two carbon atoms, and Y represents an oxygen atom.

* * * * *